United States Patent [19]
Hazlebeck et al.

[11] Patent Number: 5,316,797
[45] Date of Patent: May 31, 1994

[54] PREPARING REFRACTORY FIBERREINFORCED CERAMIC COMPOSITES

[75] Inventors: David A. Hazlebeck, El Cajon; Frederick C. Montgomery, Escondido; Holger H. Streckert, San Diego, all of Calif.

[73] Assignee: General Atomics, San Diego, Calif.

[21] Appl. No.: 553,904

[22] Filed: Jul. 13, 1990

[51] Int. Cl.⁵ .......................... B05D 3/02; B05D 1/36
[52] U.S. Cl. ............................. 427/376.2; 427/419.4; 427/419.7
[58] Field of Search ................. 427/226, 419.2, 419.4, 427/404, 419.6, 419.3, 419.7, 376.2, 343

[56] References Cited
U.S. PATENT DOCUMENTS

| | | | |
|---|---|---|---|
| 4,272,588 | 6/1981 | Yoldas | 427/164 |
| 4,376,803 | 3/1983 | Katzman | 428/408 |
| 4,382,104 | 5/1983 | Smith et al. | 427/226 |
| 4,605,588 | 8/1986 | Simpson et al. | 428/288 |
| 4,642,271 | 2/1987 | Rice | 428/698 |
| 4,738,896 | 4/1988 | Stevens | 428/315.9 |
| 4,921,731 | 5/1990 | Clark et al. | 427/314 |
| 4,935,265 | 6/1990 | Pike | 427/226 |

Primary Examiner—Peter A. Nelson
Attorney, Agent, or Firm—Fitch, Even, Tabin & Flannery

[57] ABSTRACT

Inexpensive process is provided for the application of substantially uniform metal oxide coatings onto continuous multi-filament refractory fiber tows. The resulting coated refractory fiber tows are useful, for example, for the preparation of refractory fiber composites having excellent physical and mechanical properties. Composites can be prepared employing a ceramic, metal or glass matrix.

11 Claims, 4 Drawing Sheets

PREPARING REFRACTORY FIBERREINFORCED CERAMIC COMPOSITES

This invention was made with Government Support under Contract F49620-89-C-0078 awarded by the Department of the Air Force. The Government has certain rights in this invention.

This invention relates to processes for applying coatings to continuous, multi-filament, refractory fiber tows. In a particular aspect, the invention relates to processes for applying oxide coatings to the reinforcing fibers used in the preparation of fiber-reinforced composites.

BACKGROUND OF THE INVENTION

Fibrous composites are promising lightweight, high-strength materials which retain their strength at high temperatures. The fibers contribute high tensile strength to the refractory matrix and also impart resistance to crack propagation. The high toughness of such composites has been characteristically associated with limited bonding between the fibers and the matrix in order to give substantial fiber pull-out as a major source of toughening. On the other hand, brittle failure in unsuccessful composites and resultant flat fractures with essentially no fiber pull-out have been attributed to strong fiber-matrix bonding.

In addition to controlling fiber-matrix bonding, fiber coatings can provide chemical protection from attack by the matrix during processing, as well as limiting the occurrence over time of the oxidative embrittlement of refractory fiber composites. Moreover, fiber coatings can protect fibers from mechanical damage during handling and processing. Good toughness characteristics can be introduced into composites with refractory fibers and a refractory matrix only when there is very limited bonding between the fibers and matrix, and between adjacent fibers. However, many possible combinations of fiber and matrix result in strong bonding over most, if not all, of the range of practical processing conditions, thereby limiting the potential toughness ranges of these composites. Such a problem exists, for example, with oxide-based fibers, because they have a tendency to degrade or react with the matrix when the refractory materials are molded. The reaction between the fiber and the matrix results in a high degree of bonding which renders the toughening mechanism inoperable. This problem for oxide-based fibers can be solved by creating a barrier coating on the fibers. Preferably, a suitable barrier coating would be relatively inert, and would comprise a physical separation between the refractory matrix and the reinforcing fiber. The barrier would eliminate reactions between the oxide fiber and the refractory matrix or would substantially slow the kinetics of such reactions so that toughening would result in the composite.

On the other hand, the adhesion of oxide coating to the associated fiber substrate in composite applications must be satisfactory to withstand the stresses to which the coated fibers are subjected in forming the composite structure.

While there are many methods for creating oxide coatings on fibers, none is completely suitable. For example, chemical vapor deposition has been used to provide a variety of chemical coatings. Chemical vapor deposition is frequently unsatisfactory because it requires the careful and precise injection of predetermined amounts of reactive gases containing precursors of the desired coatings as well as precise control of the temperature. Only then can the gases react at or near the surface of the fiber and deposit the desired coating on the fiber surface. Control of the deposition thickness and the quality (e.g., uniformity) of the barrier coating is difficult. A serious drawback of chemical vapor deposition processing, in addition to the aforementioned mechanical difficulties, is the high cost of such processing.

Accordingly, new coating processes which could provide thin, substantially uniform chemical coatings on continuous multi-filament fiber tows, without requiring the use of expensive chemicals and/or processing steps would be desirable.

SUMMARY OF THE INVENTION

In accordance with the present invention, we have developed an inexpensive, readily accomplished process for simultaneously applying thin, substantially uniform and continuous metal oxide coatings onto a plurality of continuous refractory fibers or filaments in the form of a tow, but with substantially no bridging of such coatings between adjacent filaments of the tow. Such coated fiber tows can be employed for the preparation of fiber-reinforced composites having excellent strength and toughness properties.

Fiber tows treated in accordance with the present invention are substantially uniformly coated, both continuously and uniformly along the length of the tow, with a refractory oxide coating. The resulting coatings can impart stability to the individual fibers with respect to both high-temperature and/or oxidizing environments. The individual filaments of the tow are coated without any substantial degree of bonding or bridging between the individual filaments of the tow.

DETAILED DESCRIPTION OF THE INVENTION

In accordance with the present invention, there is provided a process to apply a substantially uniform metal oxide coating having a thickness no greater than about 1.0 micron onto a plurality of continuous, refractory fibers or filaments in the form of a tow, said method comprising:

(a) contacting said plurality of continuous, refractory fibers with a metal oxide or metal oxide precursor containing fluid medium for a time sufficient to allow said fibers to become thoroughly wetted;

(b) optionally, treating said metal oxide or metal oxide precursor-containing fluid medium carried by said fibers under conditions suitable to cause said medium to gel;

(c) drying the wetted, optionally gel-coated, fibers under conditions suitable to substantially remove any residual fluid medium therefrom;

(d) optionally repeating step (a), and/or step (b) and step (c) for a sufficient number of times so as to further increase the total thickness of the applied coatings. Alternatively, repetition of steps (a)–(c) provides a convenient means to apply layered coatings of different metal oxides and/or different coating densities, thicknesses, etc. of the same coating, onto said fibers. Articles prepared according to the invention process are thereafter (e) heated under conditions suitable to convert substantially all of the metal oxide or metal oxide precursor deposited thereon into a substantially continuous, uniform metal oxide coating.

Optionally, steps (a)–(e) can be repeated several times so as to further increase the total thickness of the applied coatings. Alternatively, repetition of steps (a)–(e) provides a convenient means to apply layered coatings of different metal oxides and/or different coating densities, thicknesses, etc. of the same coating onto said fibers.

In accordance with another embodiment of the present invention, there are also provided substantially uniformly coated continuous, multi-filament refractory fiber tows prepared as described above.

In accordance with yet another embodiment of the present invention, there is provided a refractory fiber composite comprising uniformly coated multi-filament refractory fiber tows (prepared as described above) and a refractory matrix encapsulating the tow, as well as methods for preparing such composites.

As employed herein, the term "refractory" refers to an inorganic compound having a decomposition or softening point above about 1,100° C. As employed herein, the term "refractory fibers" refers to inorganic fibers which, both before and after treatment in accordance with the present invention, have a decomposition temperature or softening point greater than about 1,100° C.; with decomposition temperatures or softening points greater than about 1,500° C. being preferred. Refractory fibers contemplated for use in the practice of the present invention typically have a continuous maximum operating temperature of greater than about 1,000° C.; with maximum operating temperatures greater than about 1,300° C. being preferred.

Refractory fibers contemplated for use in the practice of the present invention are continuous filaments having diameters of about 50 microns or less. Multi-filament refractory fiber tows contemplated for use in the practice of the present invention comprise a plurality of the above described filaments. As employed herein, the term "continuous" refers to filaments having a substantial length such that they might be woven into a cloth or like structure, if desired.

A wide variety of continuous multi-filament refractory fiber tows can be employed in the practice of the present invention. Examples of such fiber compositions include silicon dioxide ($SiO_2$), aluminum silicate, aluminum oxide ($Al_2O_3$), mullite, titanium oxide ($TiO_2$), zirconium oxide ($ZrO_2$), zirconium silicate, silicon carbide (SiC), carbon or graphite, silicon nitride, boron nitride (BN) as well as other high temperature oxide, nitrides, carbides, silicates and metals, mixtures and complexes thereof, and the like.

Fluid media with which continuous multi-filament refractory fiber tows are contacted in accordance with the present invention include liquid media, such as aqueous, non-aqueous, and aqueous organic solutions; aqueous, non-aqueous, and aqueous organic dispersions; aqueous, non-aqueous, and aqueous organic suspensions; and aqueous, non-aqueous, and aqueous organic sols or sol-gels, each of the above media containing metal oxides or metal oxide precursors.

Metal oxides contemplated for use in the practice of the present invention conform to the formula $M_xO_y$, wherein M is selected from Group II metals, Group III metals, Group IV metals, transition metals, and Lanthanide metals; and x and y are selected so as to satisfy the valence of M and O. Exemplary metal oxides include $Al_2O_3$, $Y_2O_3$, $HfO_2$, $ZrO_2$, $SiO_2$, $MgO$, $TiO_2$, $Ta_2O_5$, $Nb_2O$, $BaO$, $BeO$, $CaO$, $Ce_2O_5$, $Cr_2O_5$, $La_2O_5$, $SrO$, $TiO$, $TiO_2$, YAG ($3Y_2O_35Al_2O_3$), mullite, mixtures and complexes of any two or more thereof, and the like.

Metal oxide precursors contemplated for use in the practice of the present invention include hydroxides, carbonates, halides, sulfates, nitrates, alkoxides, organometallics or other salt forms of any of the above described metals, M. Exemplary metal oxide precursors include aluminum hydroxide, aluminum oxide hydroxide, aluminum nitrate, aluminum alkoxides, hafnium tetrachloride, hafnium tetra(alkoxide), yttrium nitrate, yttrium alkoxides, yttrium hydroxide, magnesium hydroxide, magnesium nitrate, magnesium alkoxides, yttrium acetate and the like.

The concentration of metal oxide and/or metal oxide precursor in the fluid medium employed for contacting the continuous multi-filament refractory fiber tows can vary widely. Typically, the concentration of metal oxide and/or metal oxide precursor will fall in the range of about 0.005 up to 1.0 moles/liter.

Non-aqueous solutions contemplated for use in the practice of the present invention include solutions of oxide or oxide precursor in alcohols having up to ten carbon atoms, hydrocarbyl moieties (e.g., saturated hydrocarbons, unsaturated hydrocarbons, aromatics) having up to 10 carbon atoms, aldehydes, ketones, ethers (cyclic or acyclic), or amines having up to 10 carbon atoms and the like.

Aqueous organic solutions contemplated for use in the practice of the present invention include aqueous solvent mixtures containing in the range of about 5 up to 95 percent of any one or more of the above-described organic solvents which are miscible with water.

The above described oxide or oxide precursor-containing solutions can be converted to gel by changing the pH of the fluid medium sufficiently so as to cause gelation of the medium. Alternatively, gelation can be promoted by changing the temperature of the medium, by adding a non-solvent to the medium, by adding a curing agent (e.g., ammonia or urea) to the medium, by increasing the concentration of oxide or oxide precursor in the medium (e.g., by evaporation of some of the medium), and the like. Gelation of the medium, when carried out, can be done after contact of the fluid medium with the continuous, multi-filament refractory fiber tow.

Sol-gel solutions are essentially solutions containing a polymeric network of partially hydrolyzed or fully hydrolyzed metal salts, metal alkoxides or other organometallics. Such sol-gel solutions can be prepared as described herein or by any other procedure known to those of skill in the art.

Suitable metal alkoxides for use in the above-described sol-gel solution preferably include those having alkyl groups of up to about 10 carbon atoms. Suitable metal alkoxides include compounds of a wide variety of metals, such as those of Groups II, III, and IV of the Periodic Table, as well as transition metals and other multivalent (e.g., +3, +4, +5, and the like) metals whose alkoxides form polymeric networks upon hydrolysis. Exemplary metals which meet the above description include boron, aluminum, titanium, hafnium, yttrium, magnesium, silicon, zirconium, and other refractory types of metals.

Exemplary suitable metal alkoxides include tetramethoxysilane, tetraethoxysilane, methyltrimethoxysilane, ethyltriethoxysilane, amyltriethoxysilane, tretraethoxytitanium, tributoxyaluminum, aluminum butoxide, yttrium triisopropoxide, hafnium isopropoxide, zirconium isopropoxide, and the like.

Suitable alcohols for use in the above described sol-gel solutions are alcohols having up to about 10 carbon atoms. Often, the alkyl portion of the alcohol will be the same as that of the alkyl portion of the alkoxide. Ethanol and propanol are the preferred alcohols. In general, as with the alkoxides, the higher the molecular weight of the alcohol employed, the slower will be the subsequent drying process, as will the polymerization process for the network. It is also possible to use in place of, or in addition to the metal alkoxides, combination derivatives of alkoxides and alcohols, such as, for example, methoxyethanols.

Optionally, the metal oxide- or metal oxide precursor-containing fluid medium employed in the practice of the present invention can further comprise system compatible metal salts, such as salts of the alkali metals or alkaline earth metals, or mercury, and the like, with system compatible anions such as nitrates, acetates, and the like. These salts are added to tailor the properties of the resultant oxide coating to the desired end use. For example, addition of alkali metals to the blend will lower the glass transition temperature of the final oxide coating. Thus, these added salts have a flux-like effect. Care should be taken, however, that any added salt does not adversely influence the coherency of the ultimate oxide coating.

The art of material composites is well developed with respect to the commercial availability of a wide variety of matrix materials useful therefore, and any suitable matrix materials of such type may potentially be used in the broad practice of the present invention. Matrix compositions including silicon carbide, silicon nitride, boron nitride, zirconium oxide, silicon oxide, aluminum oxide, zirconium-titanium oxide blends, mullite, cordierite, carbon, beta-spodumene, anorthite, osumilite, titanium aluminide, titanium-tantalum aluminide, molybdenum disilicide, and the like can be employed.

For the making of the composites of the present invention, a continuous phase matrix material is provided, and the oxide-coated fiber tows of the present invention are dispersed therein. The fiber tows employed in the practice of the present invention can be incorporated into a composite arranged in any manner that adequately reinforces the matrix material. The multi-filament tows can be woven into sheets, formed into a cloth, arranged in a multidirectional array, chopped into staple fiber and laid up in any desired shape, and so forth.

A proportion of at least about 30% of the multi-filament tows, by volume, is recommended to be included in the refractory fiber composites of the present invention, with in the range of about 40 up to 60 volume percent multi-filament tow content presently preferred.

Contacting of continuous, multi-filament refractory fiber tows with metal oxide- or metal oxide precursor-containing fluid medium is typically carried out for a time sufficient to allow the fluid medium to thoroughly wet substantially all the fibers of the multi-filament fiber tow. Such contacting is typically carried out at a temperature in the range of about 15 up to 100° C. or higher, for a time in the range of about 0.01 up to 5 minutes. As employed herein, the terms "thoroughly wet" or "thoroughly wetted" indicated that the fluid medium and the fibers come into sufficiently intimate contact with each other so that the fluid medium forms a substantially continuous film on the surface of each of the treated fibers.

Figure 1:
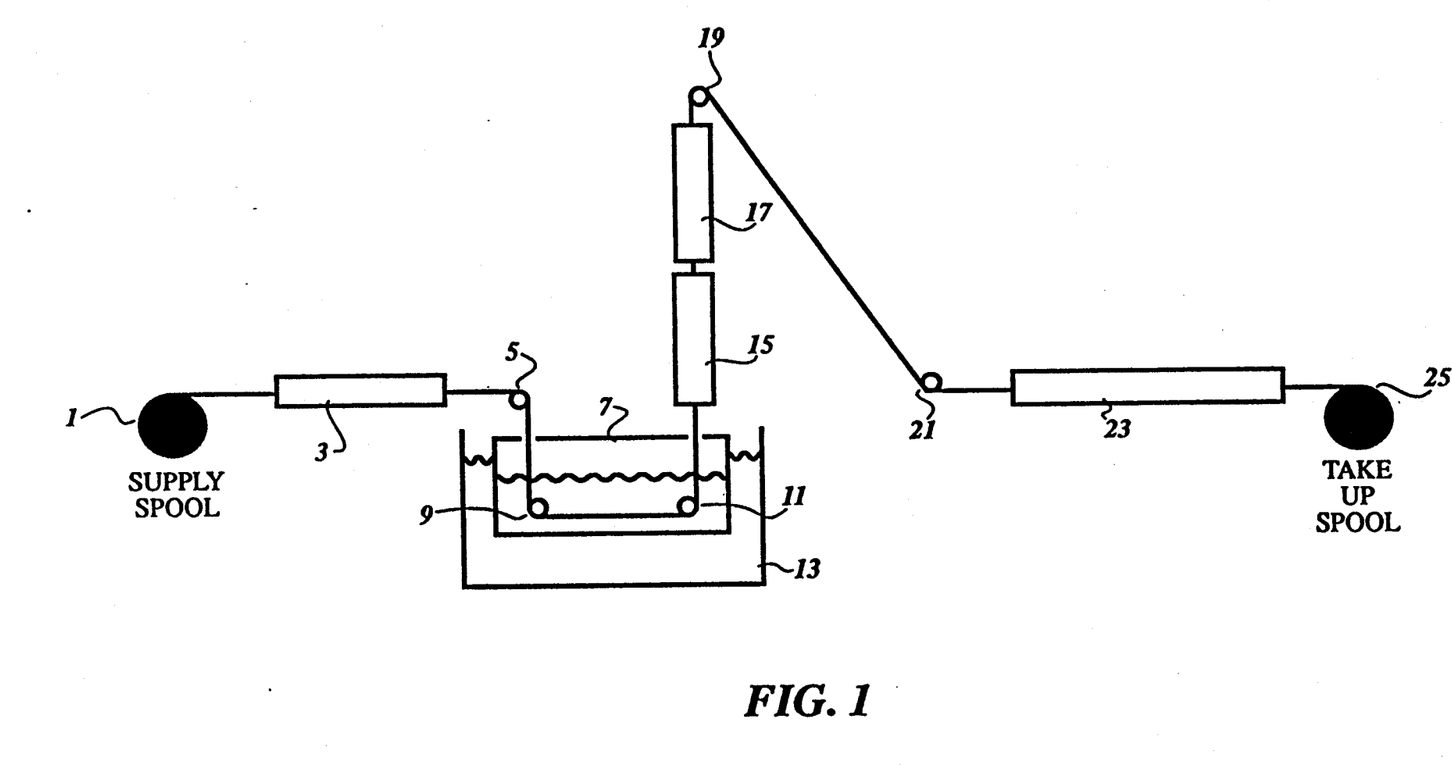
FIG. 1 is a schematic diagram of an apparatus which can be used in the practice of the present invention.

Referring now to the Figures, several means are illustrated for applying metal oxide- or metal oxide precursor- containing fluid medium to the multi-filament fiber tow. In FIG. 1, for example, tow supplied by supply spool 1 is passed through desizing chamber 3, over roller 5, then drawn through reservoir 7 by passing between rollers 9 and 11, then drawn out of reservoir 7, through curing chamber 15 and drying chamber 17 by passing the fiber tow over roller 19. Note that once the wetted tow is removed from reservoir 7, it is preferred to avoid contacting between the wetted tow and any rollers until after the wetted tow has been cured and dried. Optionally, the contents of reservoir 7 can be maintained at constant temperature and under agitation by temperature controlled agitation means 13. After being cured and dried, the fiber tow is drawn around roller 21, through calcination chamber 23 and collected onto take-up spool 25.

Figure 2:
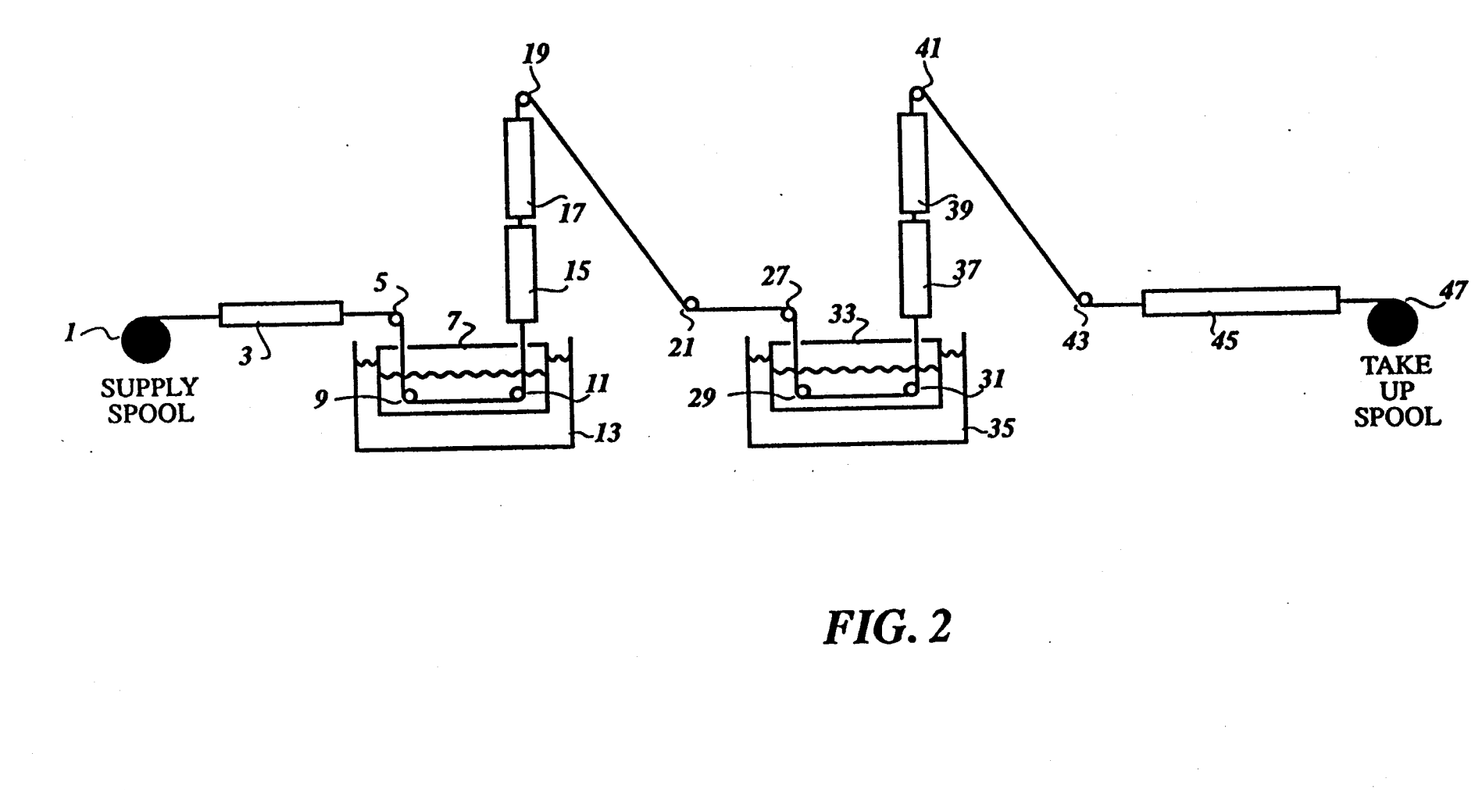
FIG. 2 is a schematic diagram of an alternative apparatus which can be used in the practice of the present invention.

An alternative means of applying fluid medium to the multi-filament fiber tow is illustrated in FIG. 2. Fiber tow provided by supply spool 1 is passed through desizing chamber 3, reservoir 7 and curing and drying chambers 15 and 17, respectively, as described above. The initially treated fiber tow is then passed through a second reservoir 33, which may contain the same or different fluid medium from that contained in the first reservoir 7. After contacting in reservoir 33 is complete, the fiber tow is passed through a second curing and drying chamber, 37 and 39, respectively. Tow is then passed over roller 41, around roller 43 and through calcination chamber 45 before being collected on take-up spool 47. This same general configuration can be further modified to allow sequential contacting as many times as desired. Thus, for certain applications, three or more contactings with the same or different fluid media will be desirable, and such can be carried out in a modified system as illustrated in FIG. 2.

Figure 3:
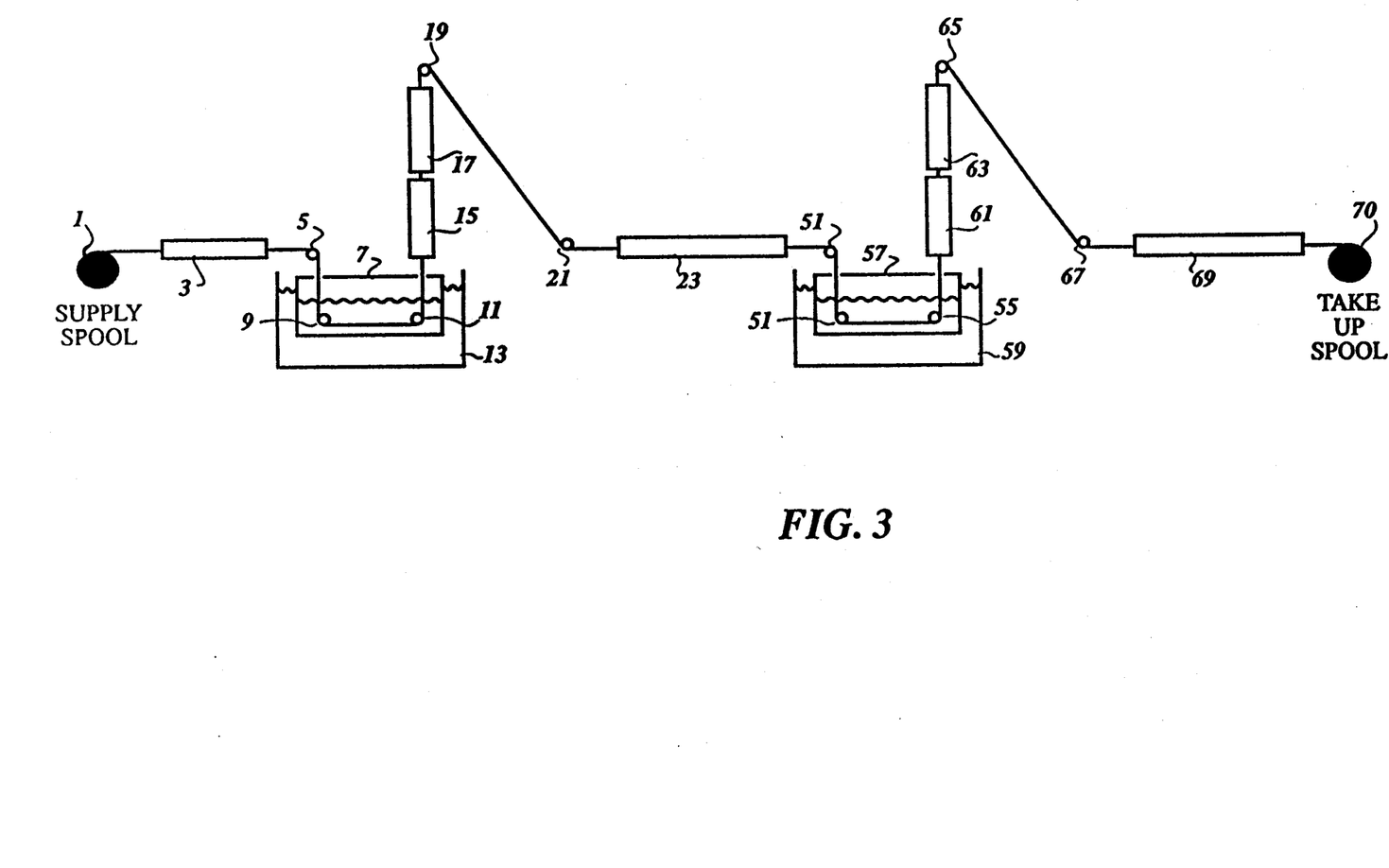
FIG. 3 is a schematic diagram of yet another alternative apparatus which can be used in the practice of the present invention.

Another alternative means of applying fluid medium to the multi-filament fiber tow is illustrated in FIG. 3. Fiber tow provided by supply spool 1 is passed through desizing chamber 3, reservoir 7, curing and drying chambers 15 and 17 respectively, and calcination chamber 23 as described above. Fiber tow is then passed through a second reservoir 57, which may contain the same or different fluid medium from that it contained in the first reservoir 7. After contacting in reservoir 57 is complete, the fiber tow is passed through a second curing and drying chamber, 61 and 63, respectively. Tow is then passed over roll 65, around roller 67 and through calcination chamber 69 before being collected on take-up spool 71. This same configuration can be further modified to allow sequential contacting as many times as desired.

In this latter mode of contacting, calcination between each contacting with fluid medium produces a fiber tow wherein each layer is somewhat distinct from the adjacent layers on the fiber. Conversely, the mode of application described with reference to FIG. 2 provides a thick oxide coating with little distinction between the separately applied layers.

Figure 4:
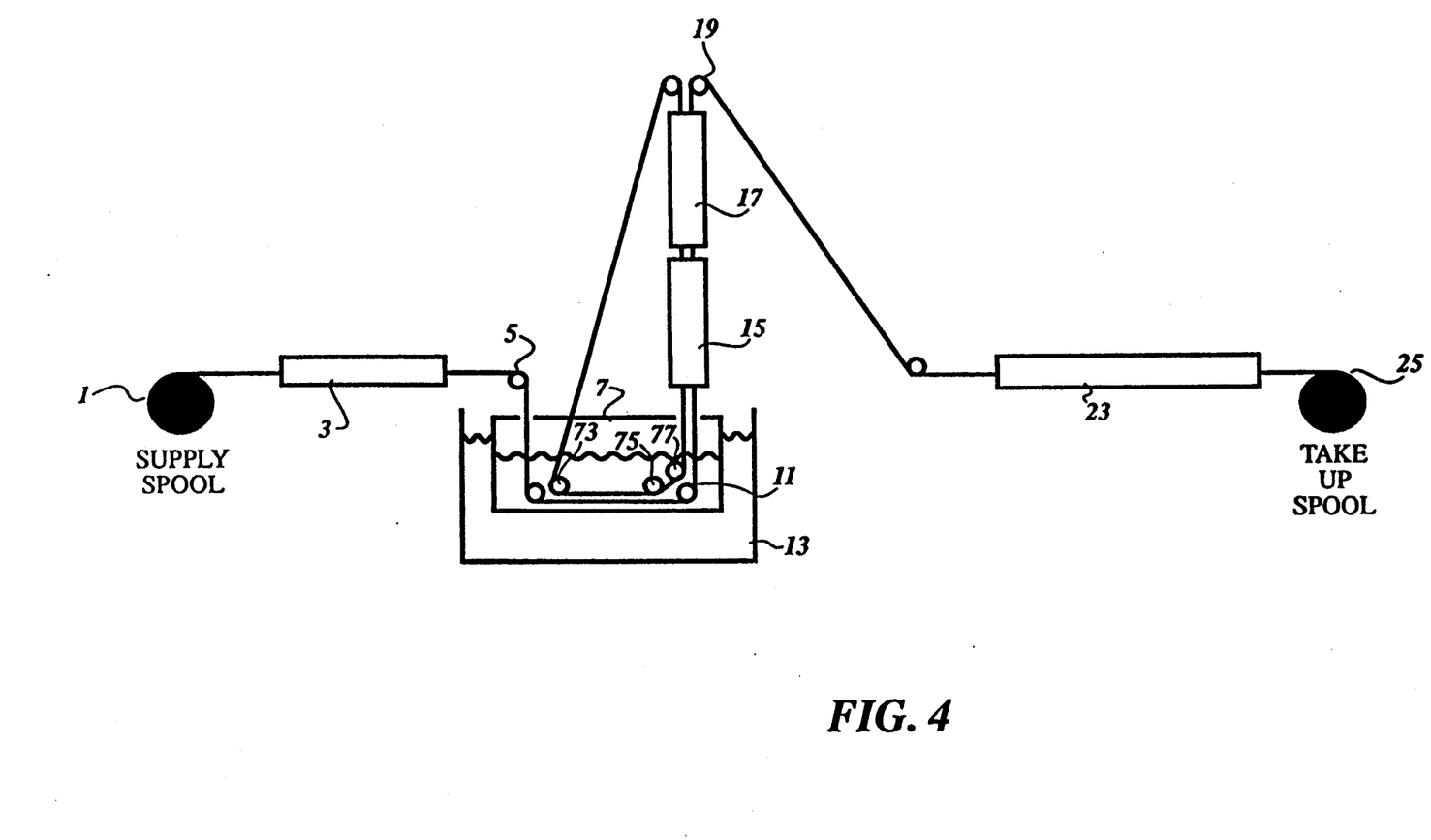
FIG. 4 is a schematic diagram of still another alternative apparatus which can be used in the practice of the present invention.

Yet another alternative means of applying fluid medium to the multi-filament fiber tow is illustrated in FIG. 4. Fiber tow provided by supply spool 1 is passed through desizing chamber 3, reservoir 7, and curing and drying chambers 5 and 7 respectively,, as described above. Fiber tow is then returned to reservoir 7 for additional contacting with the fluid medium, by passing the initially treated tow around rollers 73, 7$ and 77. Tow is then cured and dried by passage upward for a second pass through curing and drying chambers 15 and 17, respectively. Finally, tow is passed through calcination chamber 23 and collected on take-up spool 2$ as shown in the Figure. This same configuration can be modified for as many repetitions of the tow-medium contacting as desired. The apparatus illustrated herein will provide an ultimate fiber coating of almost any desired thickness, depending on how many times the tow is passed through the fluid medium. Alternatively, if desired, an elongated reservoir 7 can be employed and a second set of curing and drying chambers can be used, although there may be advantages in using a single set.

Those of skill in the art recognize that the ultimate thickness of the metal oxide coating imparted to the continuous, multi-filament refractory fiber tows will vary as a function of the concentration of oxide component in the fluid medium, the condition of contacting, as well as the affinity of the refractory material for the particular oxide coating employed. The use of agitation and/or elevated temperatures in the fluid medium-containing reservoir will facilitate penetration of the tow by the fluid medium. Fiber spreading of the individual fibers of the tow when contacted with the fluid medium will also facilitate penetration of the tow by the fluid medium.

Typically, oxide coatings are applied in increments of about 100–300 Å, with a total coating thickness, after multiple contactings, of up to about 4 microns. Preferably, the total coating is not greater than about 2 $\mu$m thick and more preferably not greater than about 1 $\mu$m. Most preferably, a total thickness of about 0.1 up to 0.5 $\mu$m is applied to the individual fibers of the multi-filament tow.

Once applied to the fiber tow, the oxide or oxide precursor materials can optionally be gelled by changing the pH of the medium (e.g., exposure to ammonia gas), by changing the temperature of the coated fiber tow, by increasing the concentration of oxide or oxide precursor (e.g., by evaporation of the water and/or organic medium), and the like.

Drying of the wetted, continuous, multi-filament refractory fiber tows is carried out under conditions suitable to substantially remove any residual fluid medium therefrom. Conditions typically employed for such drying are a temperature in a range of about 60 up to 600° C. To facilitate drying, a gentle gas stream is passed over the wetted continuous, multi-filament fiber tows during the drying process. Drying times in the range of about 0.01 up to 5 minutes are typically required. Preferably, the wetted fiber tow will be cured and dried before being brought into contact with any rollers or spools. The wetted fiber tow is preferably dried in an inert atmosphere such as nitrogen, and a similar inert nitrogen atmosphere can also be used to blanket the coating bath (e.g, reservoir 7).

The heating of the continuous, multi-filament refractory fiber tow after having been contacted with metal oxide and/or metal oxide precursor containing fluid medium, optionally cured or gelled, then dried as described above, is typically carried out under conditions suitable to convert substantially all of the metal oxide or metal oxide precursor into a continuous metal oxide coating. The phrase "continuous metal oxide coating" refers to a thin ($\leq 1.0$ microns) metal oxide coating adhered to the surface of each monofilament fiber of the treated fiber tow. The density of metal oxide coatings can be controlled as a function of the concentration of the metal oxide precursor in the fluid contacting medium (as well as the solvent/diluent used), and by the conditions employed for the curing, drying and calcining steps. Densities of the metal oxide coating can vary from about 25 up to 100% of theoretical density of the bulk metal oxide.

Typical heating conditions comprise a temperature in a range of about 600 up to 1500° C. in an oxygen-containing atmosphere for a time in the range of about 0.5 up to 30 minutes.

The invention will now be described in greater detail with reference to the following non-limiting examples.

EXAMPLES

Example 1

A treating solution is prepared containing 137.5 g. of yttrium nitrate in 500 ml of water.

A Nippon carbon ceramic fiber (available as Nicalon brand fiber) continuous multi-filament fiber tow is then passed through a vessel containing rollers submerged below the surface of the treating solution contained therein, under a positive nitrogen pressure to exclude the presence of reactive gases. The fiber tow is passed through the above-described vessel containing the above-described treating solution at a rate sufficient to allow each filament of the tow to become thoroughly wetted. Typical contact times for this step are about one minute.

The wetted multi-filament tow is then exposed to water-saturated ammonia vapors for about three minutes so as to cause the oxide species to gel.

The gel-coated multi-filament tow is then dried for 3 minutes at 150° C. in a primarily nitrogen atmosphere comprising a mixture of nitrogen, ammonia and water vapor and then heated to about 900° C. for about 12 additional minutes in an oxygen-containing atmosphere.

The resulting coated tow has a substantially uniform thin (about 0.03 micron) coating of dense yttrium oxide, as determined by scanning electron microscopy (SEM), Energy Dispensive Analysis of X-rays (EDX), and Auger Electron spectrometry.

The coated tow is considered suitable for various uses in making composites.

Example 2

A treating solution containing about 1 weight percent equivalent $Y_2O_3$ in 2-ethoxyethanol is prepared by hydrolyzing with vigorous stirring yttrium 2-ethoxyethoxide with 1 mole of water per mole of yttrium. Typically, 2.01 g of a 0.000542 mole Y/gram solution of the above alkoxide is diluted with 6.00 g dry 2-ethoxyethanol. The vessel is sealed with a septum and heated to 57° C. After 30 minutes, a solution of 19.7 mg $H_2O$ in 0.5 grams dry 2-ethoxyethanol is added dropwise from a syringe at 8 to 10 drops per minute. The solution is aged at 57° C. for at least 1 hour, cooled, and additional dry 2-ethoxyethanol added to give the desired final equivalent yttria concentration. The solution is then aged at room temperature for at least 15 hours prior to use.

A continuous multi-filament fiber tow is passed through a vessel containing the above-described treating solution for about 1 minute to allow each filament of the tow to become thoroughly wetted.

The coated multi-filament tow is then dried for 10 minutes at 350°–500° C. in an inert atmosphere (nitrogen). The coating procedure is repeated 5 times to increase the thickness of the final coating to ~0.05 μm.

After coating the tow is heated to 500 to 900° C. for 0.5 hours in air.

Example 3

An aluminum-containing treating solution is prepared by dissolving 13.77 g. Al(sec-butoxide)$_3$ in 100 ml of warm (80° C.) water. The resulting gel is peptized by adding 1.79 ml of 3.12M $HNO_3$ to the warm aqueous slurry, which is converted to a clear translucent sol by heating to about 78° C. for 17 hours. The resulting sol is then diluted (5:1) with distilled water to make the final coating solution.

Nicalon brand silicon carbide fiber tow (500 filaments of SiC) is then dip coated as described above (residence time in the coating solution is 1 minute). The dipped fibers are dried at 130° C. for about 3 minutes, then re-dipped in the same coating solution for 1 minute, dried again at 130° C. for 3 minutes, then calcined at 900° C. for about 1 hour.

The final $Al_2O_3$ coating thickness is about 0.1 micron, as determined by scanning electron microscopy (SEM), Energy Dispensive Analysis of X-rays (EDX), and Auger Electron spectrometry.

Example 4

A yttrium-containing treating solution is prepared by "dissolving" sufficient yttrium metal in isopropanol to prepare a 0.15M Y(isopropoxide)$_3$ solution.

Nextel brand mullite fiber tow (720–780 filaments in the tow) are dip coated with the above described solution according to the procedure described above (residence time in the coating solution is about one minute).

The coated fibers are cured by exposure to steam vapors for about 3 minutes, then the fibers are dried at 150° C. for about 3 minutes, and calcined at about 800° C. for 30 minutes.

The final $Y_2O_3$ coating is determined to be about 0.2 micron thick and contains substantial porosity according to SEM and EDX analyses.

The foregoing description details more specific methods that can be employed to practice the present invention and represents the best mode contemplated. However detailed the foregoing may appear in text, it should not be construed as limiting the overall scope hereof; rather, the ambit of the present invention is to be governed only by the lawful construction of the appended claims.

That which is claimed is:

1. A method for producing a refractory fiber-reinforced ceramic composite, said method comprising:

applying a substantially uniform yttrium oxide coating having a thickness no greater than about 2 microns onto each of a plurality of continuous refractory fibers in the form of a multifilament tow by carrying out the following steps:
  (a) immersing a multifilament tow containing a plurality of continuous individual fibers of refractory oxide, nitride or carbide in a reservoir of liquid medium containing yttrium 2-ethoxyethoxide in 2-ethoxyethanol for a time sufficient to allow said individual fibers to become thoroughly coated therewith;
  (b) drying said coated fibers under an inert atmosphere and at a temperature of 350°–500° C. to substantially remove any residual liquid medium from said coatings;
repeating steps (a) and (b) with said liquid medium so as to increase the total thickness of said coating adhering to each individual fiber without bridging therebetween;
heating said dried fibers under oxidizing conditions at a temperature between about 500°–900° C. to convert substantially all of said yttrium ethoxyethoxide into a substantially continuous, yttrium oxide coating of uniform thickness; and
embedding a plurality of said tows of uniformly coated individual fibers in a continuous phase ceramic matrix to create a high strength composite having high temperature resistance, with said plurality of coated tows constituting from about 40 to 60 volume percent of said ceramic composite.

2. A method according to claim 1 wherein the concentration of yttrium in said liquid medium is between 0.005 and 1 mole/liter.

3. A method according to claim 1 wherein said matrix is selected from $SiO_2$, SiC, $ZrO_2$, $Zr_2$-$TiO_2$, mullite, cordierite, $Si_3N_4$, BN, beta-spodumene, anorthite, osumilite, titanium aluminide, titanium-tantalum aluminide, and molybdenum disilicide.

4. A method for producing a refractory fiber-reinforced ceramic composite, which method comprises:

applying a substantially uniform metal oxide coating having a thickness no greater than about 2 microns onto each of a plurality of continuous refractory fibers in the form of a multifilament tow by carrying out the following steps:
  (a) immersing a tow containing a plurality of continuous individual fibers of refractory oxide, nitride or carbide in a reservoir of a liquid medium containing a metal oxide or metal oxide precursor for a time sufficient to allow said fibers throughout said tow to become thoroughly coated with said liquid uniformly thereabout;
  (b) treating said metal oxide or metal oxide precursor-containing liquid medium carried by said fibers under conditions suitable to cause said medium to gel while avoiding any physical contact with said tow;
  (c) drying said gelled coating on said individual fibers under conditions suitable to remove any residual liquid medium therefrom and create a dried, gelled coating while avoiding any physical contact with said tow until dried;
repeating steps (a), (b) and (c) using a different composition liquid medium so as to overcoat said first gelled coating on each individual fiber in said two with a second dried, gelled coating of different composition;

heating said dried fibers under conditions suitable to convert substantially all of said first metal oxide or metal oxide precursor coating and said second overcoating on each individual fiber into a substantially continuous, metal oxide coating of uniform thickness and radially varying oxide composition; and embedding a plurality of said tows of uniformly coated individual fibers in a continuous phase ceramic matrix to create a high strength composite having high temperature resistance with said plurality of coated tows constituting from about 40 to about 60 volume percent of said ceramic composite.

5. A method according to claim 4 wherein the pH of said liquid medium is increased sufficiently as to cause said medium to gel prior to such drying step (c).

6. A method according to claim 5 wherein the concentration of said metal oxide or metal oxide-precursor in said liquid medium is between about 0.005 to 1 mol/liter.

7. A method according to claim 6 wherein said immersing is carried out at a temperature in the range of about 15° C. to 120° C., for a time of up to about 5 minutes.

8. A method according to claim 7 wherein said heating is carried out at a temperature between 600° C. to 1500° C. in an oxygen-containing atmosphere for a time of up to about 30 minutes.

9. A method according to claim 8 wherein the density of said metal oxide coating is between 25 and 100 percent of theoretical maximum density of such metal oxides.

10. A method according to claim 9 wherein each of said continuous refractory fibers has a thickness between about 1 and 50 microns.

11. A method according to claim 10 wherein said matrix is selected from $SiO_2$, SiC, $ZrO_2$, $Zr_2\text{-}TiO_2$, mullite, cordierite, $Si_3N_4$, BN, beta-spodumene, anorthite, osumilite, titanium aluminide, titanium-tantalum aluminide, and molybdenum disilicide.

* * * * *

UNITED STATES PATENT AND TRADEMARK OFFICE
CERTIFICATE OF CORRECTION

PATENT NO. : 5,316,797
DATED : May 31, 1994
INVENTOR(S) : Hazlebeck, et al

It is certified that error appears in the above-indentified patent and that said Letters Patent is hereby corrected as shown below:

On title page, item [54] and col. 1, line 1, "FIBERREINFORCED" should read --FIBER-REINFORCED--.

<u>IN THE CLAIMS</u>: Column 10, Claim 1, line 31, before "60", insert --about--. Column 10, Claim 4, line 66, change "two" to --tow--. Column 12, Claim 9, line 10, after "between", insert --about--.

Signed and Sealed this

Sixth Day of September, 1994

Attest:

BRUCE LEHMAN

Attesting Officer    Commissioner of Patents and Trademarks